United States Patent
Hou et al.

(10) Patent No.: US 8,559,351 B2
(45) Date of Patent: Oct. 15, 2013

(54) DEDICATED REFERENCE SIGNAL DESIGN FOR NETWORK MIMO

(75) Inventors: Jilei Hou, San Diego, CA (US); Juan Montojo, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 12/508,026

(22) Filed: Jul. 23, 2009

(65) Prior Publication Data

US 2010/0027454 A1 Feb. 4, 2010

Related U.S. Application Data

(60) Provisional application No. 61/085,759, filed on Aug. 1, 2008.

(51) Int. Cl.
*H04H 20/71* (2008.01)
*H04W 4/00* (2009.01)
*H04J 3/26* (2006.01)
*H04W 72/00* (2009.01)
*H04W 84/04* (2009.01)

(52) U.S. Cl.
CPC ............ *H04W 72/005* (2013.01); *H04W 84/04* (2013.01)
USPC ......... 370/312; 370/328; 370/432; 455/422.1

(58) Field of Classification Search
USPC .................. 370/312, 432; 455/422, 454, 503
See application file for complete search history.

(56) References Cited

U.S. PATENT DOCUMENTS

| | | |
|---|---|---|
| 2006/0293056 A1 | 12/2006 | Kim et al. |
| 2007/0242763 A1 | 10/2007 | Li et al. |
| 2007/0242764 A1 | 10/2007 | Anigstein et al. |
| 2007/0248172 A1* | 10/2007 | Mehta et al. ................... 375/260 |
| 2008/0268887 A1* | 10/2008 | Jansen et al. ................... 455/503 |
| 2010/0027455 A1* | 2/2010 | Wang ............................. 370/312 |
| 2010/0317284 A1* | 12/2010 | Charbit et al. ..................... 455/7 |

FOREIGN PATENT DOCUMENTS

| | | |
|---|---|---|
| CN | 1653844 A | 8/2005 |
| CN | 1826738 A | 8/2006 |
| JP | 2008042249 A | 2/2008 |
| JP | 2008523665 A | 7/2008 |

(Continued)

OTHER PUBLICATIONS

Alcatel Shanghai Bell, et al., "Collaborative MIMO for LTE-A downlink," 3GPP Draft TSG RAN WG1 Meeting #53bis; R1-082501_DL Collaborative MIMO, 3rd Generation Partnership Project (3GPP), Warsaw, Poland; (Jun. 30, 2008), XP050110769, the whole document.

(Continued)

*Primary Examiner* — Paul H Masur
(74) *Attorney, Agent, or Firm* — Florin Corie

(57) ABSTRACT

Aspects describe utilizing a dedicated reference signal for supporting Network MIMO, distributed MIMO, Coordinated MultiPoint, and the like. A data modulation symbol is transmitting in the same direction as a pilot modulation symbol is transmitted. Two or more wireless devices can coordinate communications such that transmission of the same pilot modulation symbol and the same data modulation symbol are transmitted to a device in different directions, each direction associated with a wireless device and intended for a particular mobile device. Cluster-specific scrambling and/or user-group specific scrambling can be employed and a scrambling code can be communicated prior to transmission of the pilot modulation symbols and data modulation symbols.

42 Claims, 13 Drawing Sheets

(56) References Cited

FOREIGN PATENT DOCUMENTS

| RU | 2292116 C2 | | 1/2007 |
|---|---|---|---|
| TW | 200830911 | | 7/2008 |
| WO | WO03081938 A1 | | 10/2003 |
| WO | WO2005011157 | | 2/2005 |
| WO | 2007008757 A1 | | 1/2007 |
| WO | 2007111449 A1 | | 10/2007 |
| WO | 2007123029 A1 | | 11/2007 |
| WO | WO2008058143 | * | 5/2008 |
| WO | WO2008058149 | * | 5/2008 |

OTHER PUBLICATIONS

International Search Report and Written Opinion—PCT/US2009/052513, International Search Authority—European Patent Office—Nov. 24, 2009.

Alcatel-Lucent: "Collaborative MIMO" IEEE C802.16M-07/244R1, [Online] pp. 1-9, XP002559332 Jul. 11, 2007 Retrieved from the Internet: URL: http://wirelessman.org/tgm/index-older.html>.

Ericsson: "A discussion on some technology components for LTE-Advanced" 3GPP Meeting, TSG-RAN WG1#53, Kansas City, MO, USA, No. R1-082024, May 5-9, 2008,—pp. 1-11, XP002541666 paragraph [0001] paragraph C02.31—paragraph C02.41.

Ericsson: "R1-082469: LTE-Advanced Coordinated Multipoint Transmission/Reception," (Jun. 30-Jul. 4, 2008) Internet Citation pp. 1-6, Retrieved on Jul. 4, 2008, XP002574186.

NTT DoCoMo et al., "Dedicated Reference Signal for Beam-forming in E-UTRA Downlink", 3GPP, TSG RAN WG1 Meeting #47bis, R1-070089, Jan. 15-19, 2007.

Qualcomm Europe: "Network MIMO for Downlink Transmission in LTE-Advanced", 3GPP TSG RAN WG1 Meeting #54, R1-083192, Aug. 18-22, 2008.

Taiwan Search Report—TW098125898—TIPO—Oct. 31, 2012.

Taiwan Search Report—TW098125898—TIPO—Apr. 30, 2013.

Texas Instruments: "Network MIMO Precoding" 3rd Generation Partnership Project (3GPP) TSG RAN WG1 #53bis; No. R1-082497, Jul. 4, 2008, pp. 1-4, XP002559609.

* cited by examiner

DEDICATED REFERENCE SIGNAL DESIGN FOR NETWORK MIMO

CROSS-REFERENCE

This is an application claiming priority to Provisional Application No. 61/085,759, entitled "DEDICATED REFERENCE SIGNAL DESIGN FOR NETWORK MIMO" filed Aug. 1, 2008, and assigned to the assignee hereof and the entirety of which is hereby expressly incorporated by reference herein.

BACKGROUND

I. Field

The following description relates generally to communications in a multiple-input-multiple-output network and more particularly to Single Frequency Network (SFN) transmission of a Distributed Reference Signal (DRS) through layer-specific channelization.

II. Background

Wireless communication systems are widely deployed to provide various types of communication content such as voice, data, and so on. These systems may be multiple-access systems capable of supporting communication with multiple users by sharing available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3GPP Long Term Evolution (LTE) systems, and Orthogonal Frequency Division Multiple Access (OFDMA) systems. As demand for high-rate and multimedia data services rapidly grows, there is a challenge to implement efficient and robust communication systems with enhanced performance.

Generally, a wireless multiple-access communication system can simultaneously support communication for multiple wireless terminals. Each terminal communicates with one or more base stations through transmissions on forward and reverse links. Forward link (or downlink) refers to communication link from the base stations to the terminals, and reverse link (or uplink) refers to communication link from the terminals to the base stations. Communication links may be established through a single-in-single-out (SISO) system, a multiple-in-single-out (MISO) system, or a multiple-in-multiple-out (MIMO) system.

A MIMO system employs multiple ($N_T$) transmit antennas and multiple ($N_R$) receive antennas for data transmission. A MIMO channel formed by $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. MIMO systems can provide improved performance (e.g., higher throughput, greater reliability, and so forth) if additional dimensionalities created by multiple transmit and receive antennas are utilized.

MIMO systems support Time Division Duplex (TDD) and/or Frequency Division Duplex (FDD) systems. In a TDD system, forward and reverse link transmissions are on the same frequency region so that the reciprocity principle allows estimation of the forward link channel from the reverse link channel. This enables the access point to extract transmit beamforming gain on the forward link when multiple antennas are available at the access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with single frequency network (SFN) transmission of Distributed Reference Signals (DRS) through layer-specific channelization. Additionally or alternatively, various aspects relate to orthogonalization of pilots across multiple Distributed MIMO (D-MIMO) layers (e.g., through TDM, CDM, FDM, and so forth). In accordance with another aspect, cluster or user-group specific DRS scrambling is utilized to randomize interference across clusters.

An aspect relates to a method performed by a first wireless device for using a dedicated reference signal for supporting Coordinated MultiPoint transmission. Method includes coordinating with a second wireless device a transmission of a first data modulation symbol to a first user device. Method also includes transmitting in a first direction first data modulation symbol intended for first user device and transmitting a first pilot modulation symbol in first direction.

Another aspect relates to a wireless communications apparatus that includes a memory and a processor. Memory retains instructions related to synchronizing with a second wireless communications apparatus a transmission of a first data modulation symbol to a first mobile device. Memory also retains instructions related to transmitting in a first direction first modulation symbol and a first pilot modulation symbol. A processor is coupled to memory and is configured to execute instructions retained in memory.

According to another aspect is a wireless communications apparatus that utilizes a dedicated reference signal for supporting Coordinated MultiPoint transmission. Wireless communications apparatus includes means for cooperating with a second wireless communications apparatus a transmission of a first data modulation symbol to a first device and a second data modulation symbol to a second device. Wireless communications apparatus also includes means for transmitting in a first direction first data modulation symbol and a first pilot modulation symbol and means for transmitting in a second direction second data modulation symbol and a second pilot modulation symbol.

Yet another aspect relates to a computer program product, comprising a computer-readable medium. Computer-readable medium includes a first set of codes for causing a computer to synchronize a transmission of a first data modulation symbol to a first mobile device. Computer-readable medium also includes a second set of codes for causing computer to transmit in a first direction first modulation symbol and a first pilot modulation symbol. Synchronizing with second wireless communications apparatus comprises employing cooperative beam-forming.

A further aspect relates to at least one processor configured to utilize a dedicated reference signal for supporting Coordinated MultiPoint transmission. Processor includes a first module for coordinating a transmission of a first data modulation symbol to a first device and a second data modulation symbol to a second device. Processor also includes a second module for transmitting in a first direction first data modulation symbol and a first pilot modulation symbol intended for a first device and a third module for transmitting in a second direction second data modulation symbol and a second pilot modulation symbol intended for a second device.

According to another aspect is a method performed by a mobile device for receiving a dedicated reference signal for supporting Coordinated MultiPoint. Method includes receiving from a first direction a data modulation symbol intended for mobile device. Method also includes receiving a pilot modulation symbol from first direction. A receipt of data modulation symbol at mobile device was coordinated between a first communications apparatus and at least a second communications apparatus.

Another aspect relates to a wireless communications apparatus that includes a memory and a processor. Memory retains instructions related to receiving from a first direction a data modulation symbol and receiving a pilot modulation symbol from first direction. Data modulation symbol and pilot modulation symbol received from first direction are from a first node that coordinated with at least a second node. Processor is coupled to memory and is configured to execute instructions retained in memory.

A further aspect relates to a wireless communications apparatus that receives a dedicated reference signal for supporting Coordinated MultiPoint. Wireless communications apparatus includes means for receiving from a first direction a data modulation symbol and a pilot modulation symbol. Wireless communications apparatus also receives means for receiving, from a second direction, data modulation symbol and pilot modulation symbol. First direction and second direction were coordinated between at least two wireless devices.

Another aspect relates to a computer program product, comprising a computer-readable medium. Computer-readable medium includes a first set of codes for causing a computer to receive from a first direction a data modulation symbol and a pilot modulation symbol. Computer-readable medium also includes a second set of codes for causing the computer to receive from a second direction data modulation symbol and pilot modulation symbol.

Still another aspect relates to at least one processor configured to utilize a dedicated reference signal for supporting Coordinated MultiPoint reception. Processor includes a first module for receiving a data modulation symbol and a pilot modulation symbol from a first direction. Processor also includes a second module for receiving, from a second direction, data modulation symbol and pilot modulation symbol.

To the accomplishment of the foregoing and related ends, one or more aspects comprise the features hereinafter fully described and particularly pointed out in the claims. The following description and the annexed drawings set forth in detail certain illustrative features of one or more aspects. These features are indicative, however, of but a few of the various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
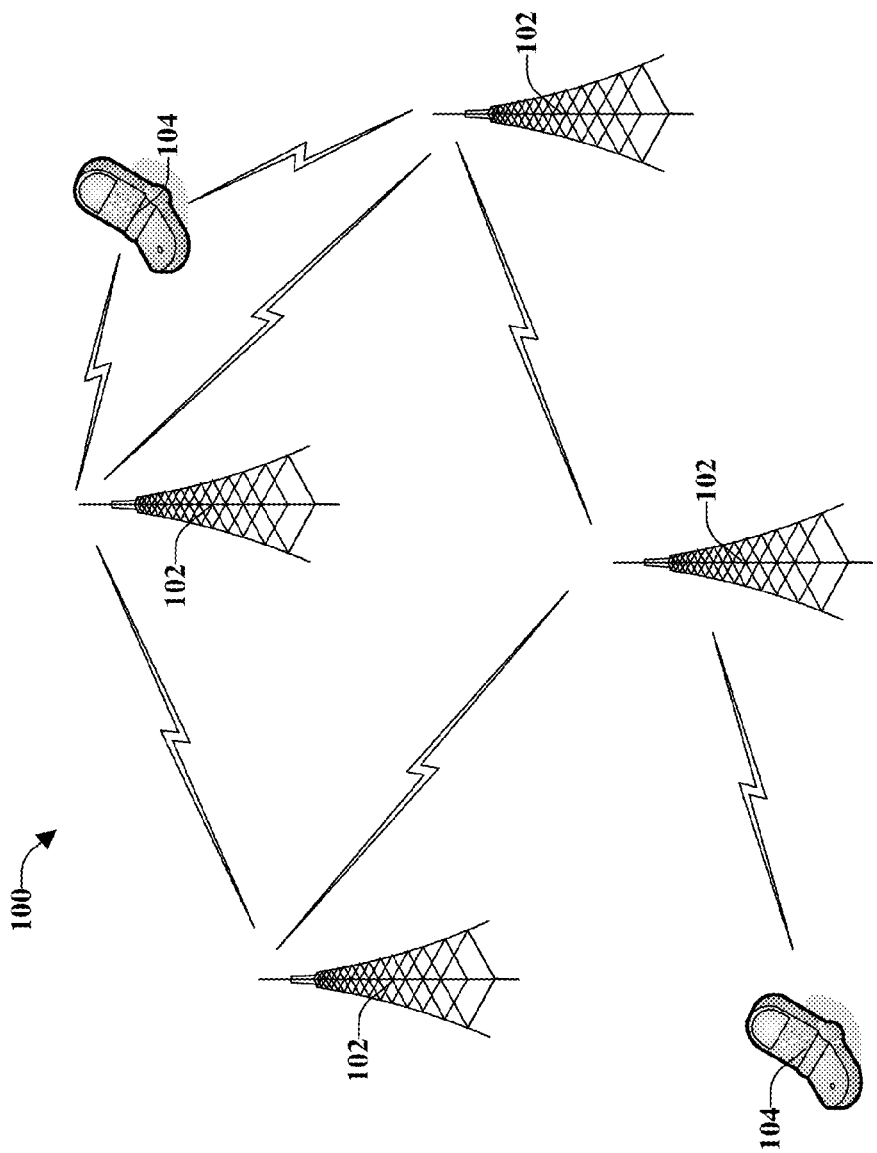
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

With reference to FIG. 1 illustrated is a wireless communication system 100 in accordance with various aspects presented herein. System 100 can comprise one or more base stations 102 in one or more sectors that receive, transmit, repeat, and so forth, wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 104 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art.

In network MIMO (also referred to distributed MIMO or Coordinated MultiPoint), different cells cooperate to transmit information to one or more receivers (e.g., mobile devices, base stations, and so forth). For example, instead of a first cell transmitting a modulation symbol "x" to a first mobile device and a second cell transmitting a modulation symbol "y" to a second mobile device, first cell can transmit ax+by, while second cell can transmit cx+dy. Coefficients a, b, c, and d can be chosen to optimize some metrics, such as Signal-to-Noise Ratio (SNR) of either (or both) first mobile device or second mobile device, system capacity, and so forth.

From mobile device's perspective, this is equivalent to different layers being transmitted from multiple antennas and decoding can be similar to decoding of conventional MIMO systems. However, if a common reference signal is used for channel estimation, mobile device should be aware of the values of coefficients a, b, c, and d (e.g., "beam directions"). This can be conveyed to mobile device through a separate message (e.g., Packet Data Control Channel (PDCCH) in LTE). However, this can prove to be expensive as multiple base stations need to indicate their beam directions. For example, in a three-cell, three-user system, a total of nine (based on the equation 3×3=9) beam directions need to be signaled. Moreover, the total number of available beam directions needed to help ensure efficient cooperation (e.g., cooperative transmit interference nulling) may be too large, resulting in excessively large overhead per control message. As will be described in further detail below, the disclosed aspects utilize Dedicated Reference Signal (DRS) for supporting network MIMO (or distributed MIMO or Coordinated Multi-Point).

Figure 2:
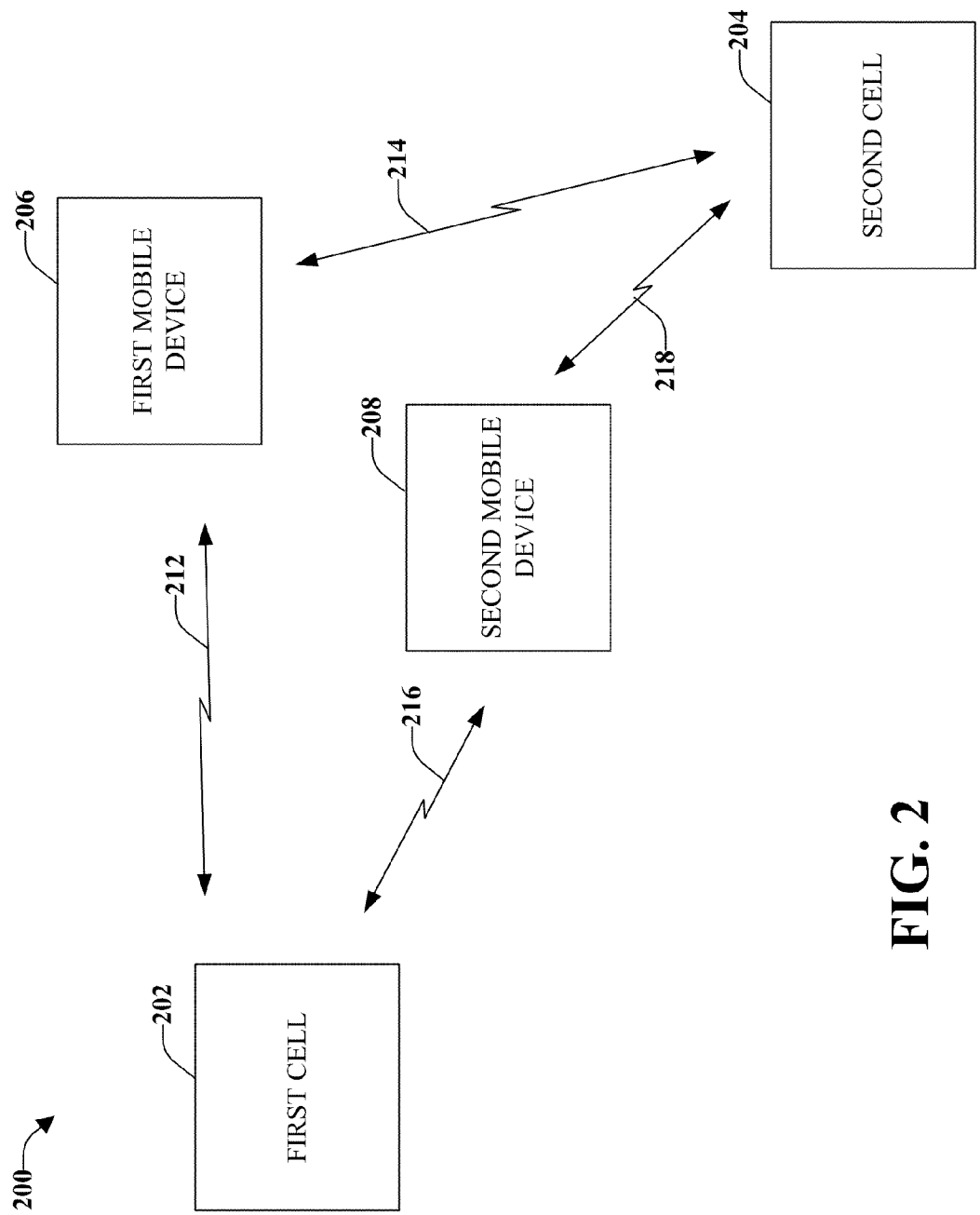
FIG. 2 illustrates a schematic representation of a system that utilizes a dedicated reference signal for supporting network MIMO, according to an aspect.

FIG. 2 illustrates a schematic representation of a system 200 that utilizes a dedicated reference signal for supporting network MIMO, according to an aspect. System 200 includes a first cell 202 that communicates information with at least a second cell 204. Wireless communications apparatus 202 can also convey data to a multitude of mobile devices, two of which are illustrated as first mobile device 206 and second mobile device 208.

In a conventional MIMO system, there is a transmitter (e.g., first cell 202) that has multiple antennas (e.g. two antennas) and transmits data from those two antennas on two different waveforms (e.g., same waveform with different beam-forming applied). A network MIMO system (distributed MIMO system, Coordinated MultiPoint system) utilizes a similar concept, however the different antennas do not belong to the same cell, but belong to different cells (e.g., first cell 202 and second cell 204).

For example, first cell 202 would transmit a modulation symbol "x" to first mobile device 206 (which is served by first cell 202) and second cell 204 would transmit modulation symbol "y" to second mobile device 208. First cell 202 and second cell 204 would communicate on a backhaul link or in some other manner and decide to jointly transmit to both first mobile device 206 and second mobile device 208. Thus, first cell 202 transmits "ax+by" and second cell 204 transmits "cx+dy" and these are the coefficients chosen to improve a matrix, such as Signal-Noise Ratio (SNR) of system 200, system capacity, or a combination there of.

From the perspective of first mobile device 206 and second mobile device 208, the signals are not decoded differently. However, mobile devices 206, 208 should be able to estimate the channel from first cell 202 and second cell 204 and should be informed of the values "a", "b", "c" and "d". Thus, these different coefficients needs to be conveyed, wherein the coefficients are beam directions that are chosen by first cell 202 and second cell 204. Further, the number of different directions can increase if there are more cells that coordinate (e.g., overhead).

In accordance with various aspects presented herein, first cell 202 and second cell 204 coordinate transmission to first mobile device 204 and second mobile device 206, such that, from perspective of first mobile device 204 and second mobile device 206 the transmission appears to be from a single source. It should be understood that although reference is made to two cells and two mobile devices, there can be more (or fewer) cells and more (or fewer) mobile devices that utilize various aspects disclosed herein.

Coordination between first cell 202 and second cell 204 can include directions in which data modulation symbols and pilot modulation symbols are transmitted to each mobile device. For example, coordination can specify that first cell 202 transmits a first data modulation symbol and a first pilot modulation symbol to first mobile device 206 in a first direction 212 and that second cell 202 transmits first data modulation symbol and first pilot modulation symbol to first mobile device 206 in a second direction 214.

Further, coordination can specify that first cell 202 transmits a second data modulation symbol and a second pilot modulation symbol to second mobile device 208 in a third direction 216 and that second cell 202 transmits second data modulation symbol and second pilot modulation symbol to second mobile device 208 in a fourth direction 218.

Figure 3:
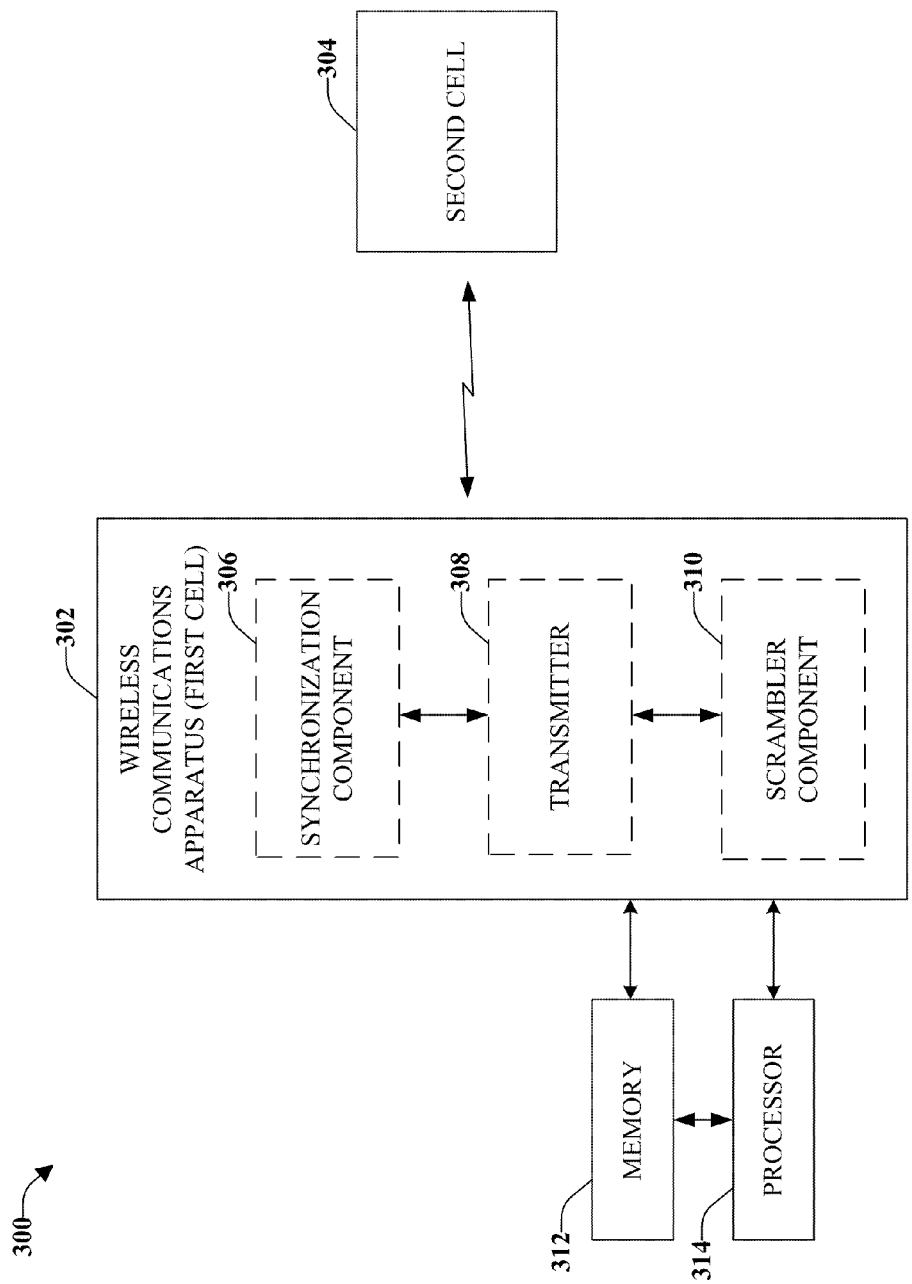
FIG. 3 illustrates a wireless communications apparatus that utilizes a dedicated reference signal for supporting network MIMO, according to an aspect.

FIG. 3 illustrates a system 300 that utilizes a dedicated reference signal for supporting network MIMO, according to an aspect. System 300 includes a wireless communications apparatus 302 that utilizes a dedicated reference signal for supporting network MIMO. Wireless communications apparatus 302 (also referred to as first cell) and second cell 304 cooperate to improve communications as discussed herein. For example, first cell 302 and second cell 304 can transmit a pilot in the same direction as they are transmitting data (e.g., a mobile device). For example, first cell 302 (which can be first cell 202 of FIG. 2) transmits a pilot modulation symbol p in a first direction (e.g., direction "a") and a second cell 304 (e.g., second cell 204 of FIG. 2) can transmit the same modulation symbol in a second direction (e.g., direction "c"). The pilot modulation symbol is received at an antenna associated with mobile device (e.g., first mobile device 206 of FIG. 2) in direction $(h_1 a + h_2 c)p$, where $h_1$ and $h_2$ are channel fades from first cell 302 and second cell 304 to receiver (e.g., first mobile device 206 of FIG. 2). In a similar manner, a second pilot symbol q can be transmitted by first cell 302 in a direction "b" and by second cell 304 in a direction "d". This second pilot symbol q can enable mobile device to estimate $(h_1 b + h_2 d)$.

In accordance with this aspect, if x and y are transmitted, the symbol received at mobile device is $(h_1 a + h_2 c)x + (h_1 b + h_2 d)y$. Since $(h_1 a + h_2 c)$ and $(h_1 b + h_2 d)$, and similar coefficient for other receiver antennas (e.g., second mobile device 208) are estimated from the pilots.

According to some aspects, for improved channel estimation accuracy, pilots p and q are sent on orthogonal resources (e.g., each D-MIMO layer has its own sets of pilot resources). Orthogonal resources can be Time Division Multiplexed (TDMed) resources, Frequency Division Multiplexed (FDMed) resources, Code Division Multiplexed (CDMed) resources, or combinations thereof.

To mitigate confusion of channels between different cell clusters (e.g., first cell 302 and second cell 304 versus a third cell and a fourth cell) that utilize the same pilot resources, a cluster-specific scrambling may be applied. Alternately, a receiver-group specific scrambling may be applied. Scrambling code information may be predetermined or may be dynamically changed and transmitted to mobile device, such as on a control channel.

Wireless communications apparatus 302 includes a synchronization component 306 that is configured to coordinate with second cell 304 a transmission of a first data modulation symbol to a first user device. Synchronization component 306 can also coordinate transmission of a second data modulation symbol to a second user device. Further, synchronization component 306 can coordinate transmission of subsequent data modulation symbols to subsequent mobile devices. Additionally, synchronization component 306 can coordinate transmission with other cells.

Also included in wireless communications apparatus 302 is a transmitter 308 that is configured to convey first data modulation symbol and a first pilot modulation symbol to a first user in a first direction, based on the coordination. Transmitter 308 is also configured to convey second data modulation symbol and a second pilot modulation symbol to a second user in a second direction, based on the coordination. Further, transmitter 308 is configured to convey subsequent data modulation symbols and subsequent pilot modulation symbols to other users, based on the coordination.

Second cell 304, based on the coordination, transmits first data modulation symbol and first pilot modulation symbol in a third direction. Further, second cell 304, based on the coordination, transmits second data modulation symbol and second pilot modulation symbol in a fourth direction.

Transmitter 308 can transmit first pilot modulation symbol on a first layer and second pilot modulation symbol on a second layer. In accordance with some aspects, transmitter 308 can include first pilot modulation symbol in a first dedicated reference signal and can include second pilot modulation symbol in a second dedicated reference signal. First dedicated reference signal can be sent on a first layer and second dedicated reference signal can be sent on a second layer. First layer and second layer can be mutually orthogonal. According to some aspects first dedicated reference signal and second dedicated reference signal target Physical Downlink Shared Channel demodulation. In accordance with an aspect, first dedicated reference signal and second dedicated reference signal are processed through a pre-coding operation. According to another aspect, first dedicated reference signal and second dedicated reference signal are included in resource blocks and layers scheduled by wireless communications apparatus 302 for transmission.

In accordance with some aspects, transmitter 308 can convey first pilot modulation symbol and second modulation symbol on orthogonal resources. In accordance with some aspects, first pilot modulation symbol and second pilot modulation symbol are transmitted on Time Division Multiplexed resources, Frequency-Division Multiplexed resources, Code-Division Multiplexed resources, or combinations thereof.

Additionally, wireless communications apparatus 302 can include a scrambler component 310 that is configured to apply a cluster-specific scrambling before transmitter 308 conveys the modulation symbols in first direction and second direction. A scrambling code for cluster-specific scrambling can be predetermined. In accordance with some aspects, transmitter 308 conveys, on respective control channels, to first mobile device and second mobile device a scrambling code for cluster-specific scrambling. In accordance with some aspects, scrambler component 310 applies a user-group specific scrambling before transmitter 308 conveys data in first direction and second direction.

In accordance with some aspects, instructions related to synchronizing comprise instructions related to employing cooperative beam-forming. In cooperative beam-forming, an interfering cell chooses a beam direction that minimizes interference to a particular mobile device. For example, first cell 32 has two transmit antennas and second cell 304 has two transmit antennas. Assume that the channel coefficient from second cell 304 to a mobile device being served by first cell 302 is "1" and "−1". Second cell 304 transmits a modulation symbol "x" on first antenna and modulation symbol "y" on second antenna. When symbols are received at mobile device the symbols are received as "1" plus "−1", which is equal to zero. Thus, effectively, second cell 304 is not interfering with transmissions from first cell 302. To perform this, second cell 304 has chosen certain coefficients "1" and "−1" to minimize interference caused to mobile device that is being served by first cell 302. Thus, even though second cell 304 is not directly communicating with mobile device, second cell 304 is choosing its coefficient to improve communications of mobile device.

System 300 can include memory 312 operatively coupled to wireless communications apparatus 302. Memory 312 can be external to wireless communications apparatus 302 or can reside within wireless communications apparatus 302. Memory 312 can store information related to synchronizing with a second wireless communications apparatus (e.g., second cell 304) a transmission of a first data modulation symbol to a first mobile device and transmitting in a first direction first modulation symbol and a first pilot modulation symbol. Synchronizing with second wireless communications apparatus can include employing cooperative beam-forming.

In accordance with some aspects, memory 312 retains further instructions related to applying a cluster-specific scrambling before transmitting in first direction and conveying to first mobile device a scrambling code for cluster-specific scrambling. According to another aspect, memory 312 retains further instructions related to synchronizing with second wireless communications apparatus a transmission of a second data modulation symbol to a second mobile device and transmitting in a second direction second data modulation symbol and second pilot modulation symbol. Further, memory 312 retains further instructions related to transmitting first pilot modulation symbol and second pilot modulation symbol on Time Division Multiplexed resources, Frequency-Division Multiplexed resources, Code-Division Multiplexed resources, or combinations thereof.

Memory 312 can further store other suitable information related to signals transmitted and received in a communication network. Further, memory 312 can store protocols associated with dedicated reference signals, taking action to control communication between wireless communications apparatus 302 and other devices, such that system 300 can employ stored protocols and/or algorithms to achieve improved communications in a wireless network as described herein.

At least one processor 314 can be operatively connected to wireless communications apparatus 302 (and/or memory 312) to facilitate analysis of information related to a dedicated reference signal design for network MIMO. Processor 314 can be a processor dedicated to analyzing and/or generating information received by wireless communications apparatus 302, a processor that controls one or more components of system 300, and/or a processor that both analyzes and generates information received by wireless communications apparatus 302 and controls one or more components of system 300.

In accordance with some aspects, processor 314 is configured to utilize a dedicated reference signal for supporting Coordinated MultiPoint transmission. Processor 314 includes a first module for coordinating a transmission of a first data modulation symbol to a first device and a second data modulation symbol to a second device. Processor 314 also includes a second module for transmitting in a first direction first data modulation symbol and a first pilot modulation symbol intended for a first device. Further, processor 314 includes a third module for transmitting in a second direction second data modulation symbol and a second pilot modulation symbol intended for a second device. Further, second and third module can transmit first pilot modulation symbol and second pilot modulation symbol on Time Division Multiplexed resources, Frequency-Division Multiplexed resources, Code-Division Multiplexed resources, or combinations thereof.

In view of the exemplary systems shown and described above, methodologies that may be implemented in accordance with the disclosed subject matter, will be better appreciated with reference to the following flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
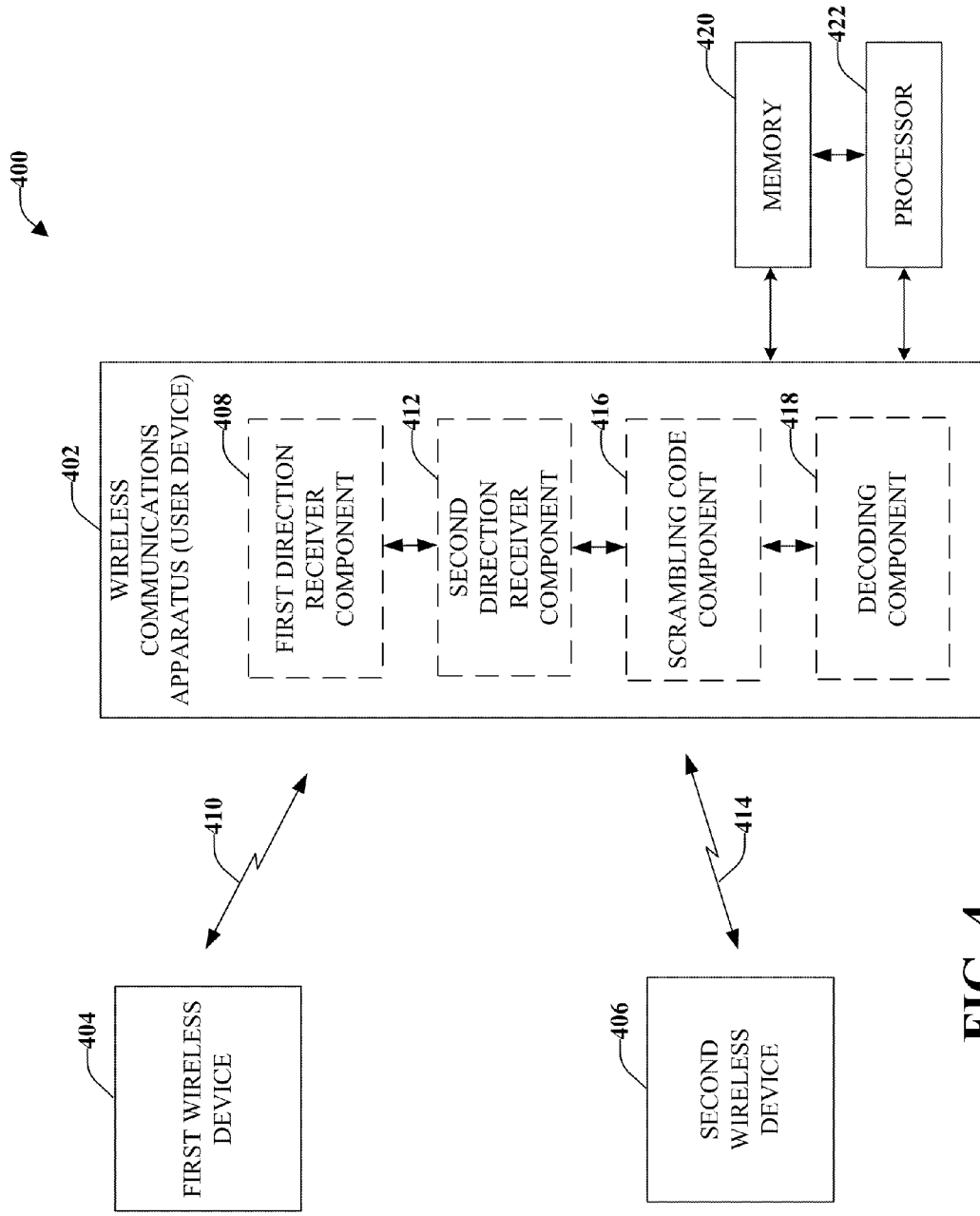
FIG. 4 illustrates a system for receiving a dedicated reference signal for supporting Coordinated Multipoint.

FIG. 4 illustrates a system 400 for receiving a dedicated reference signal for supporting Coordinated Multipoint. System 400 includes a wireless communications apparatus 402 (sometimes referred to as user device) that is configured to receive modulation signals from a first wireless device 404 and at least a second wireless device 406.

Included in wireless communications apparatus 402 is a first direction receiver component 408 that is configured to receive from a first direction 410 a data modulation symbol and a pilot modulation symbol. First wireless device 404 transmitted data modulation symbol and pilot modulation symbol in first direction 410.

Also included in wireless communications apparatus 402 is a second direction receiver component 412 that is configured to receive from at least a second direction 414 data modulation symbol and pilot modulation symbol. Second wireless device 406 transmitted data modulation symbol and pilot modulation symbol in second direction 414. Further, first wireless device 404 and second wireless device 406 coordinated their respective transmissions of data modulation symbol and pilot modulation symbol. Pilot modulation symbol can be received on Time Division Multiplexed resources, Frequency-Division Multiplexed resources, Code-Division Multiplexed resources, or combinations thereof.

Additionally, wireless communications apparatus 402 includes a scrambling code component 416 that is configured to obtain a scrambling code for a cluster-specific scrambling. Cluster-specific scrambling can be applied to data modulation symbol and pilot modulation symbol by first wireless device 404 and second wireless device 406. A decoding component 418 is configured to decode data modulation symbol and pilot modulation symbol with scrambling code. In accordance with some aspects, scrambling code component 416 receives a user-group specific scrambling, which can be applied to data modulation symbol and pilot modulation symbol by first wireless device 404 and second wireless device 406.

System 400 can include memory 420 operatively coupled to wireless communications apparatus 402. Memory 420 can be external to wireless communications apparatus 402 or can reside within wireless communications apparatus 402. Memory 420 can store information related to receiving from first direction 410 a data modulation symbol and receiving a pilot modulation symbol from first direction 410. Data modulation symbol and pilot modulation symbol received from first direction 410 are from first wireless device 404 that coordinated the transmission with second wireless device 406. In accordance with some aspects, memory 420 retains further instructions related to receiving from first direction 410 a cluster-specific scrambling code before receiving data modulation symbol.

In accordance with some aspects, memory 420 retains further instructions related to receiving from second direction 414 data modulation symbol and receiving pilot modulation symbol from second direction 414. Data modulation symbol and pilot modulation symbol received from second direction 414 are from second wireless device 406. According to various aspects, pilot modulation symbol is received on Time-Division Multiplexed resources, Frequency-Division Multiplexed resources, Code-Division Multiplexed resources, or combinations thereof.

According to some aspects, memory 420 retains further instructions related to receiving on a control channel a scrambling code for a cluster-specific scrambling, which is applied by first wireless device 404 and second wireless device 406. In another aspect, memory 420 retains further instructions related to receiving a user-group specific scrambling that is applied by first wireless device 404 and second wireless device 404.

Memory 420 can further store other suitable information related to signals transmitted and received in a communication network. Further, memory 420 can store protocols associated with dedicated reference signals, taking action to control communication with first mobile device 404, second mobile device 406, and other devices, such that system 400 can employ stored protocols and/or algorithms to achieve improved communications in a wireless network as described herein.

At least one processor 422 can be operatively connected to wireless communications apparatus 402 (and/or memory 420) to facilitate analysis of information related to a dedicated reference signal design for network MIMO. Processor 422 can be a processor dedicated to analyzing and/or generating information received by wireless communications apparatus 402, a processor that controls one or more components of system 400, and/or a processor that both analyzes and generates information received by wireless communications apparatus 402 and controls one or more components of system 400.

In accordance with some aspects, processor 422 is configured to utilize a dedicated reference signal for supporting Coordinated MultiPoint transmission. Processor 422 includes a first module for receiving a data modulation symbol and a pilot modulation symbol from first direction 410. Processor 422 also includes a second module for receiving from second direction 414 data modulation symbol and pilot modulation symbol. Further, first module and second module can receiving pilot modulation symbol on Time Division Multiplexed resources, Frequency-Division Multiplexed resources, Code-Division Multiplexed resources, or combinations thereof.

Figure 5:
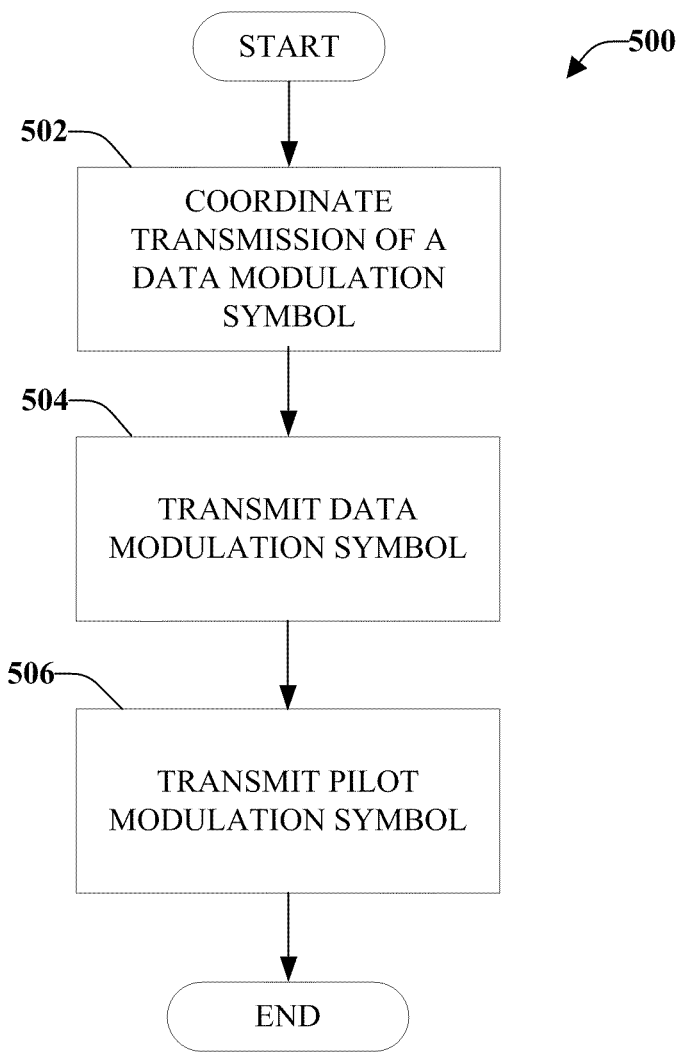
FIG. 5 illustrates a method for using a dedicated reference signal for supporting Coordinated MultiPoint transmission to a device, according to an aspect.

FIG. 5 illustrates a method 500 for using a dedicated reference signal for supporting Coordinated MultiPoint transmission to a device, according to an aspect. Method 500 can be performed by a first cell. At 502, first cell coordinates transmission of a data modulation symbol to a user device. The transmission can be coordinated with a second cell (or more cells). Coordination with second cell can include employing cooperative beam-forming. At 504, data modulation symbol is transmitted in a first direction. Data modulation symbol is intended for user device. A pilot modulation symbol is transmitted, at 506, in first direction. First direction can be determined as a function of the coordination, at 502.

In accordance with some aspects, method 500 can include applying a cluster-specific scrambling before first cell transmits in first direction and a second direction. A scrambling code for cluster-specific scrambling can be predetermined. According to some aspects, method 500 includes conveying on respective control channels to first user device and a second user device a scrambling code for cluster-specific scrambling. Further, according to some aspects, method 500 includes applying a user-group specific scrambling before transmitting in first direction and transmitting in a second direction.

According to various aspects, second cell, as a function of the coordination, can transmit in a second direction data modulation symbols intended for user device. Second cell can also transmit in second direction a pilot modulation symbol.

Figure 6:
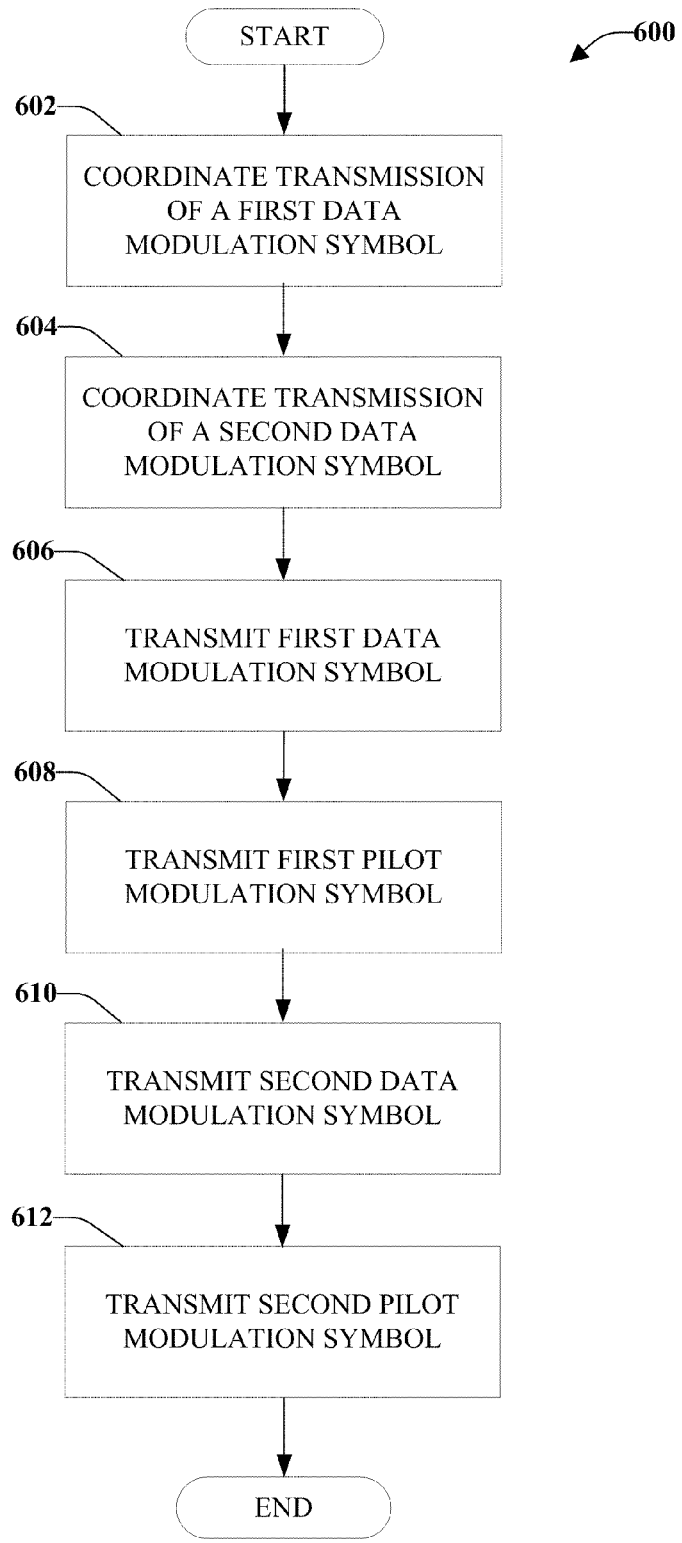
FIG. 6 illustrates a method for using a dedicated reference signal for supporting Coordinated MultiPoint transmission to more than one device, according to an aspect.

FIG. 6 illustrates a method 600 for using a dedicated reference signal for supporting Coordinated MultiPoint transmission to more than one device, according to an aspect. Method 600 can be performed by a first cell. Method 600 starts, at 602, when transmission of a first data modulation symbol to a first user is coordinated with one or more other cells, referred to herein as second cell. At 604, transmission of a second data modulation symbol to a second user device is coordinated with second cell. At 606, first data modulation symbol intended for first user device is transmitted in first direction. First pilot modulation symbol is transmitted, at 608, in first direction. At 610, second data modulation symbol intended for second device is transmitted in second direction. At 612, second pilot modulation symbol is transmitted in second direction.

Second cell, based on the coordination, transmits in a third direction first data modulation symbol intended for first user and transmits first pilot modulation symbol. Further, second cell, based on the coordination, transmits in a fourth direction second data modulation symbol intended for second user device and transmits second pilot modulation symbol.

In accordance with some aspects, first pilot modulation symbol is transmitted on a first layer and second pilot modulation symbol is transmitted on a second layer. Additionally, method 600 can comprise including first pilot modulation symbol in a first dedicated reference signal and second pilot modulation symbol in a second dedicated reference signal. First dedicated reference signal can be transmitted on a first layer and second dedicated reference signal can be transmitted on a second layer. First layer and second layer are mutually orthogonal. Alternatively, transmitting first pilot modulation symbol and second pilot modulation symbol includes transmitting first pilot modulation symbol and second pilot modulation symbol on orthogonal resources.

According to various aspects, transmitting can include transmitting first pilot modulation symbol and second pilot modulation symbol on Time Division Multiplexed resources, Frequency-Division Multiplexed resources, Code-Division Multiplexed resources, or combinations thereof.

According to another aspect, method 600 can comprise including first pilot modulation symbol in a first dedicated reference signal and second pilot modulation symbol in a second dedicated reference signal. First dedicated reference signal and second dedicated reference signal target Physical Downlink Shared Channel demodulation.

In accordance with some aspects, method 600 includes processing first dedicated reference signal and second dedicated reference signal through a pre-coding operation. Alternatively, method 600 comprises including first dedicated reference signal and second dedicated reference signal in resource blocks and layers scheduled by first cell for the transmission.

In accordance with some aspects, a computer program product can include a computer-readable medium that comprises codes for carrying out various aspects of methods 500, 600. Computer-readable medium can include a first set of codes for causing a computer to synchronize a transmission of a first data modulation symbol to a first mobile device. Computer-readable medium can also include a second set of codes for causing computer to transmit in a first direction first modulation symbol and a first pilot modulation symbol. Synchronizing with second wireless communications apparatus comprises employing cooperative beam-forming.

In accordance with some aspects, computer-readable medium also includes a third set of codes for causing computer to apply a cluster-specific scrambling before transmitting in first direction and a fourth set of codes for causing the computer to convey to first mobile device a scrambling code for cluster-specific scrambling. According to some aspects, computer-readable medium includes a third set of codes for causing computer to synchronize a transmission of a second data modulation symbol to a second mobile device and a fourth set of codes for causing computer to transmit in a second direction second data modulation symbol and a second pilot modulation symbol.

Figure 7:
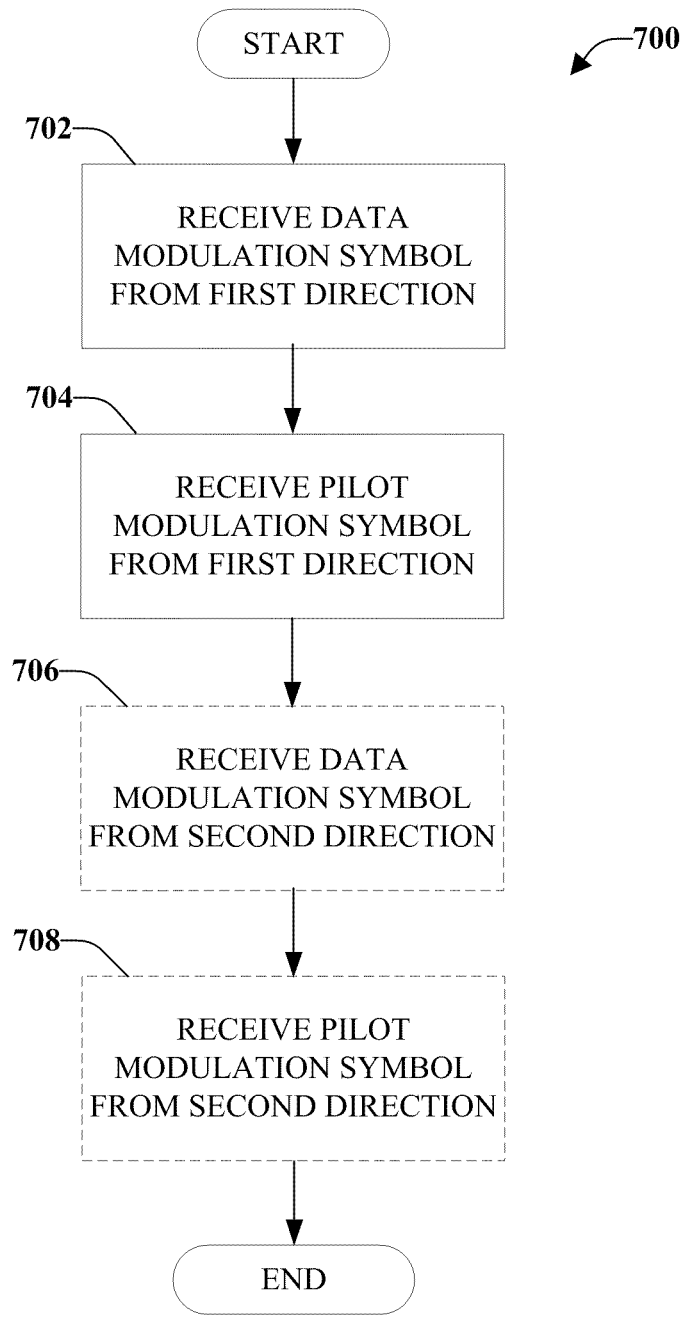
FIG. 7 illustrates a method for receiving a dedicated reference signal for supporting Coordinated MultiPoint.

FIG. 7 illustrates a method for receiving a dedicated reference signal for supporting Coordinated MultiPoint. Method 700 can be performed by a user device. Method 700 starts, at 702, when a data modulation symbol is received from a first direction. Data modulation symbol is intended for user device. At 704, a pilot modulation symbol is received from first direction. A receipt of data modulation at user device was coordinated between a first communications apparatus and at least a second communications apparatus.

In accordance with some aspects, method 700 can continue, at 706, with receiving data modulation symbol, intended for mobile device. Data modulation symbol is received from a second direction. At 708, pilot modulation symbol is received from second direction. Data modulation symbol and pilot modulation symbol are received from first direction from first communications apparatus and from second direction from second communications apparatus. Receiving can include receiving pilot modulation symbol on Time Division Multiplexed resources, Frequency-Division Multiplexed resources, Code-Division Multiplexed resources, or combinations thereof.

According to some aspects, method 700 can include receiving a user-group specific scrambling. User-group specific scrambling is applied by first wireless communications apparatus and second wireless communications apparatus before receiving from first direction and receiving from second direction. According to another aspect, method 700 can include receiving on a control channel a scrambling code for a cluster-specific scrambling, which is applied by first wireless communications apparatus and second wireless communications apparatus before receiving from first direction and second direction.

Figure 8:
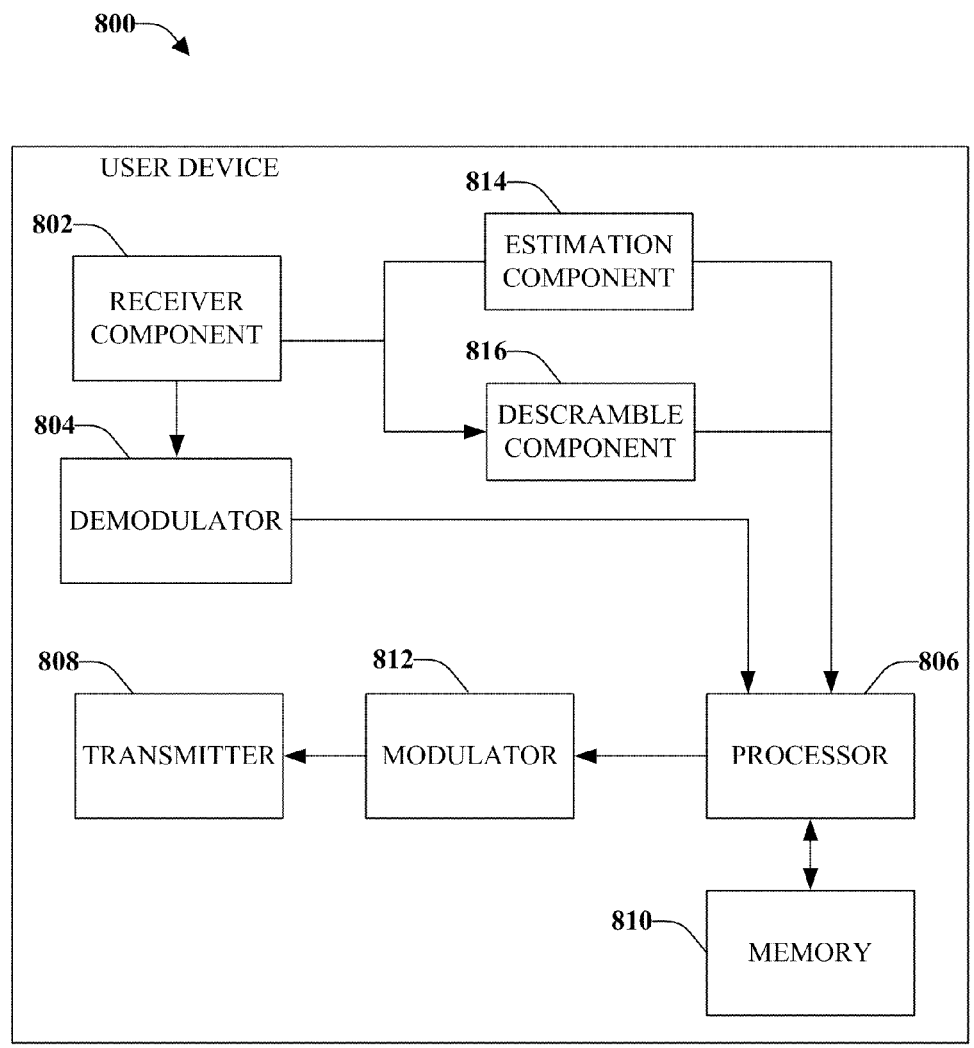
FIG. 8 illustrates a system that facilitates usage of a dedicated reference signal for network MIMO in accordance with one or more of the disclosed aspects.

With reference now to FIG. 8, illustrated is a system 800 that facilitates usage of a dedicated reference signal for network MIMO in accordance with one or more of the disclosed aspects. System 800 can reside in a user device. System 800 comprises a receiver component 802 that can receive a signal from, for example, a receiver antenna. Receiver component 802 can perform typical actions thereon, such as filtering, amplifying, downconverting, etc. the received signal. Receiver component 802 can also digitize the conditioned signal to obtain samples. A demodulator 804 can obtain received symbols for each symbol period, as well as provide received symbols to a processor 806.

Processor 806 can be a processor dedicated to analyzing information received by receiver component 802 and/or generating information for transmission by a transmitter 808. In addition or alternatively, processor 806 can control one or more components of user device 800, analyze information received by receiver component 802, generate information for transmission by transmitter 808, and/or control one or more components of user device 800. Processor 806 may include a controller component capable of coordinating communications with additional user devices.

User device 800 can additionally comprise memory 810 operatively coupled to processor 806. Memory 810 can store information related to coordinating communications and any other suitable information. Memory 810 can additionally store protocols associated with dedicated reference signals. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the disclosed aspects is intended to comprise, without being limited to, these and any other suitable types of memory. User device 800 can further comprise a symbol modulator 812, wherein transmitter 808 transmits the modulated signal.

Receiver component 802 is further operatively coupled to an estimation component 814 that is configured to calculate a received modulation symbol. For example, if modulation symbol "x" and modulation symbol "y" are received, the received symbol (in absence of noise) is $(h_1a+h_2c)x+(h_1b+h_2d)y$. Since $(h_1a+h_2c)$ and $(h_1b+h_2d)$, and similar coefficients for other receiver antennas (e.g., second mobile device) are estimated from the pilots. In accordance with some aspects, an appropriate receiver is utilized to estimate "x" (or "y") using, for example, an MMSE receiver or a SIC receiver.

Additionally, receiver component 802 can be operatively coupled to a descramble component 816 that is configured to receive a scrambling code for a cluster-specific scrambling. The scrambling code is applied to the received data by descramble component 816 in order to interpret the data.

Figure 9:
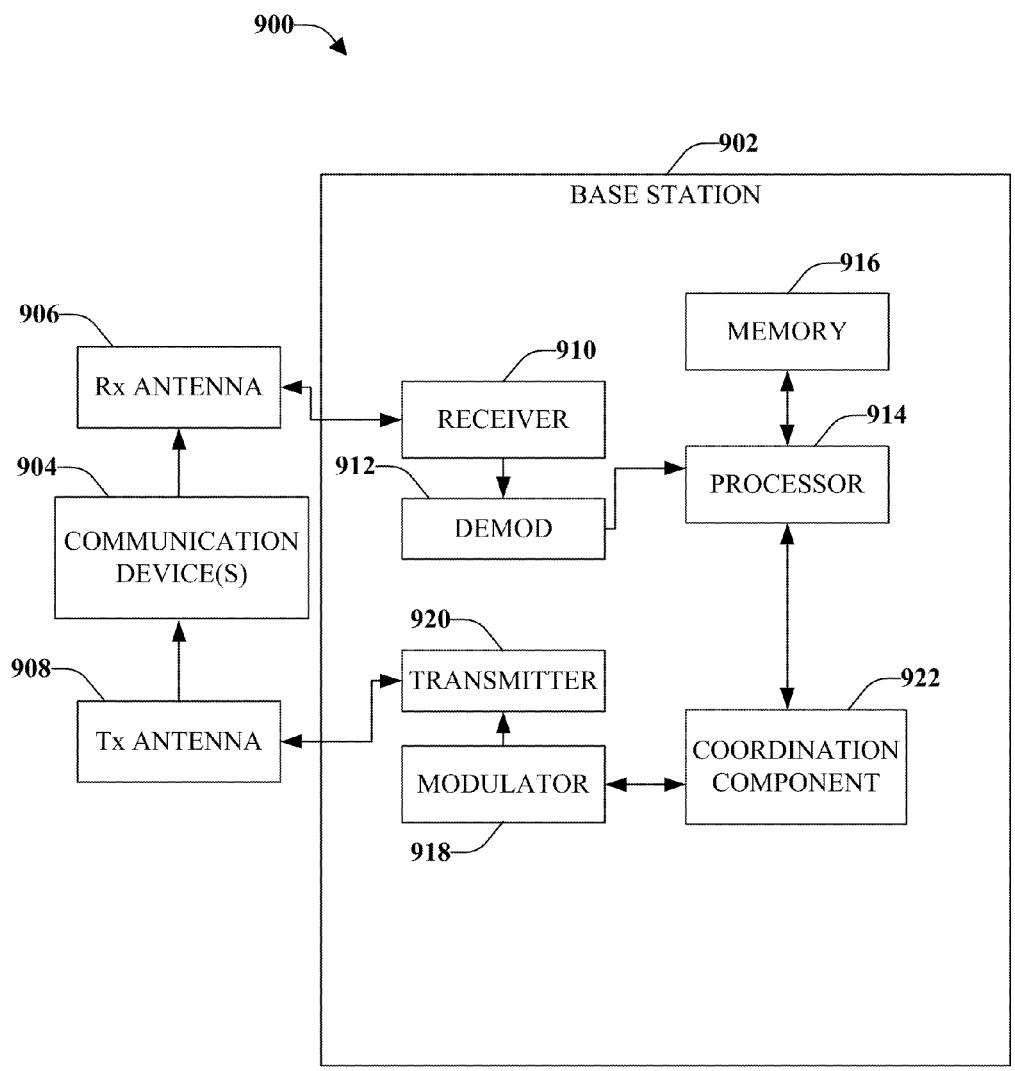
FIG. 9 illustrates a system that facilitates utilization of a dedicated reference signal design for network MIMO in accordance with various aspects presented herein.

FIG. 9 is an illustration of a system 900 that facilitates utilization of a dedicated reference signal design for network MIMO in accordance with various aspects presented herein. System 900 comprises a base station or access point 902. As illustrated, base station 902 receives signal(s) from one or more communication devices 904 (e.g., user device) by a receive antenna 906, and transmits to the one or more communication devices 904 through a transmit antenna 908.

Base station 902 comprises a receiver 910 that receives information from receive antenna 906 and is operatively associated with a demodulator 912 that demodulates received information. Demodulated symbols are analyzed by a processor 914 that is coupled to a memory 916 that stores information related to using a dedicated reference signal for supporting Coordinated MultiPoint transmission. A modulator 918 can multiplex the signal for transmission by a transmitter 920 through transmit antenna 908 to communication devices 904.

Processor 914 is further coupled to a coordination component 922 that is configure to interact with other base stations, in different cells, to manage transmission of data modulation symbols and pilot modulation symbols to devices. The interaction can include determining a route or direction that should be utilized to send the modulation symbols.

Figure 10:
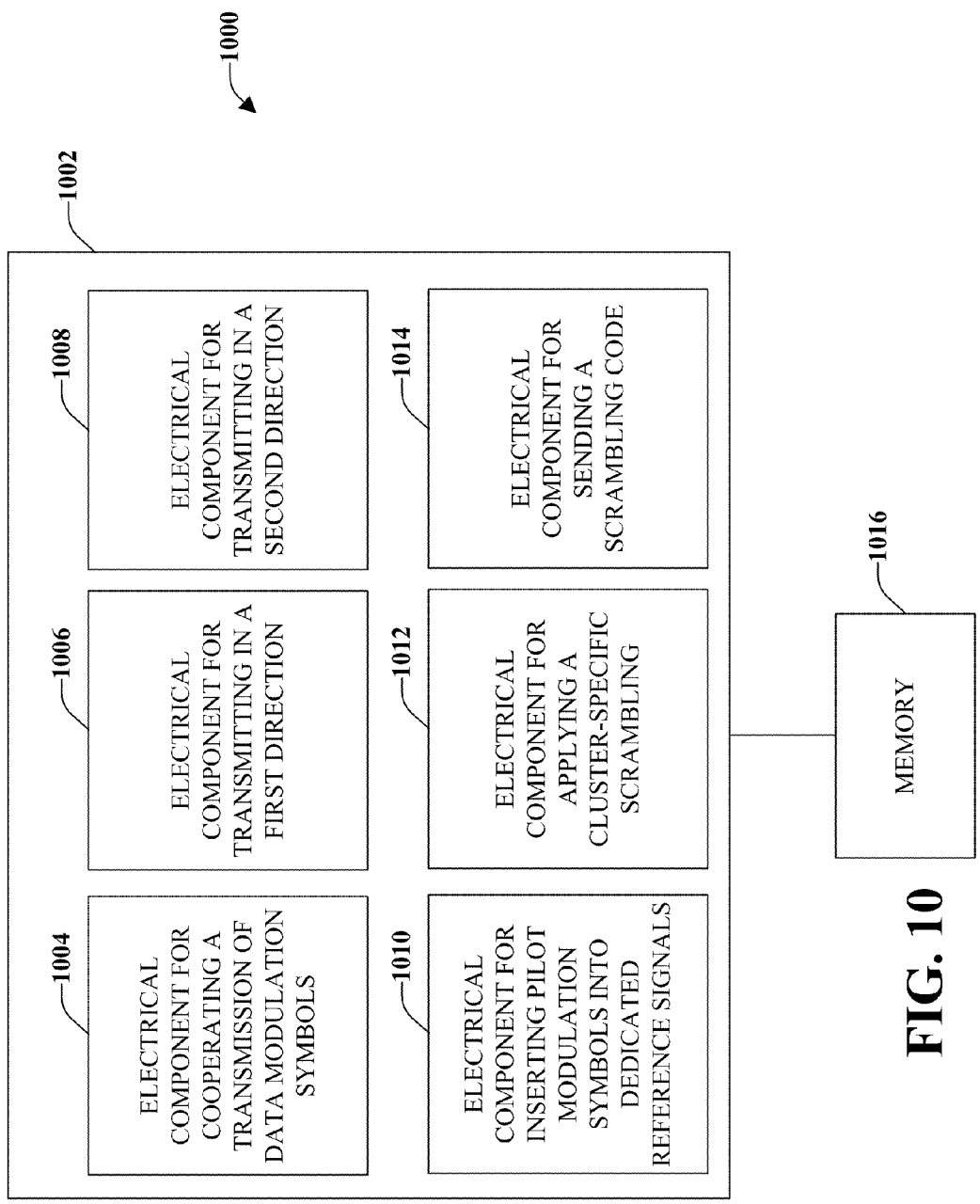
FIG. 10 illustrates an example system that utilizes a dedicate reference signal for supporting Coordinated MultiPoint transmission, according to an aspect.

With reference to FIG. 10, illustrated is an example system 1000 that utilizes a dedicate reference signal for supporting Coordinated MultiPoint transmission, according to an aspect. System 1000 may reside at least partially within a cell (e.g., wireless communications apparatus). It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. Logical grouping 1002 may include an electrical component 1004 for cooperating with at least a second cell (or at least a second wireless communications apparatus) a transmission of a first data modulation symbol to a first device and a second data modulation symbol to a second device. In accordance with some aspects, the cooperation includes employing cooperative beam-forming. Also included in logical grouping 1002 is an electrical component 1006 for transmitting in a first direction first data modulation symbol and a first pilot modulation symbol. Further, logical grouping 1002 includes an electrical component 1008 for transmitting in a second direction second data modulation symbol and a second pilot modulation symbol. First pilot modulation symbol and second pilot modulation symbol can be transmitted on Time Division Multiplexed resources, Frequency-Division Multiplexed resources, Code-Division Multiplexed resources, or combinations thereof.

In accordance with some aspects, electrical component 1006 for transmitting in first direction transmits first pilot modulation symbol on a first layer and electrical component 1008 for transmitting in second direction transmits second pilot modulation symbol on a second layer.

Additionally, logical grouping 1002 can include an electrical component 1010 for inserting first pilot modulation symbol in a first dedicated reference signal and second pilot modulation symbol in a second dedicated reference signal. Electrical component 1006 for transmitting in first direction transmits first dedicated reference signal on a first layer and electrical component 1008 for transmitting in second direction transmits second dedicated reference signal on a second layer. First layer and second layer are mutually orthogonal.

Alternatively or additionally, logical grouping 1002 includes an electrical component 1012 for applying a cluster-specific scrambling. A scrambling code for cluster-specific scrambling can be predetermined. Logical grouping 1002 can also include an electrical component 1014 for sending scrambling code to first device and to second device.

Additionally, system 1000 can include a memory 1016 that retains instructions for executing functions associated with electrical components 1004, 1006, 1008, 1010, 1012, and 1014 or other components. While shown as being external to memory 1016, it is to be understood that one or more of electrical components 1004, 1006, 1008, 1010, 1012, and 1014 may exist within memory 1016.

Figure 11:
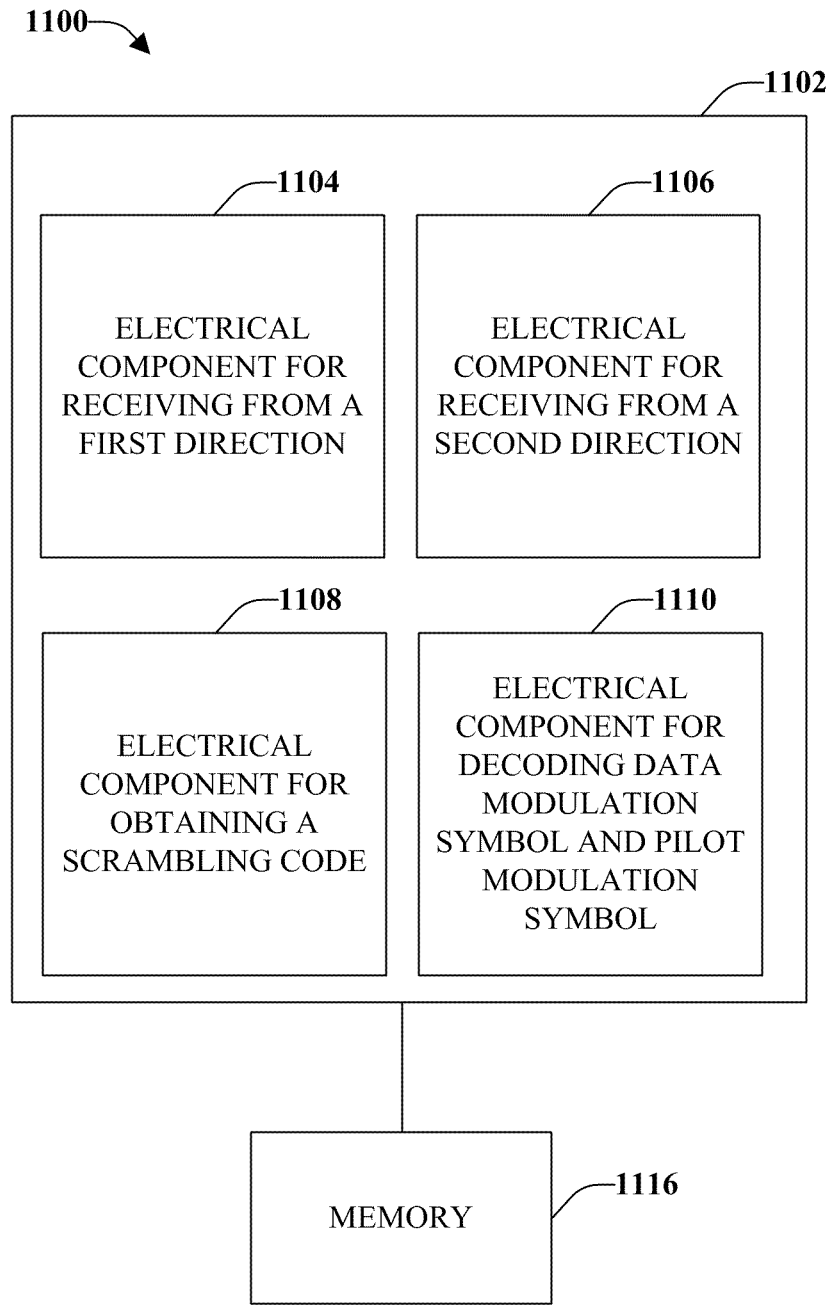
FIG. 11 illustrates an example system that receives a dedicate reference signal for supporting Coordinated MultiPoint, according to an aspect.

FIG. 11 illustrates an example system 1100 that receives a dedicated reference signal for supporting Coordinated MultiPoint, according to an aspect. System 1100 may reside at least partially within a user device. It is to be appreciated that system 1100 is represented as including functional blocks, which may be functional blocks that represent functions implemented by a processor, software, or combination thereof (e.g., firmware).

System 1100 includes a logical grouping 1102 of electrical components that can act separately or in conjunction. Logical grouping 1102 may include an electrical component 1104 for receiving from a first direction a data modulation symbol and a pilot modulation symbol. Also included in logical grouping 1102 is an electrical component 1106 for receiving from a second direction data modulation symbol and pilot modulation symbol. First direction and second direction were coordinated between at least two wireless devices (e.g., cells).

In accordance with some aspects, logical grouping 1102 includes an electrical component 1108 for obtaining a scrambling code for a cluster-specific scrambling applied to data modulation symbol and pilot modulation symbol. Also included in logical grouping 1102 can be an electrical component 1110 for decoding data modulation symbol and pilot modulation symbol with scrambling code.

Additionally, system 1100 can include a memory 1116 that retains instructions for executing functions associated with electrical components 1104, 1106, 1108, and 1110 or other components. While shown as being external to memory 1116, it is to be understood that one or more of electrical components 1104, 1106, 1108, and 1110 may exist within memory 1116.

Figure 12:
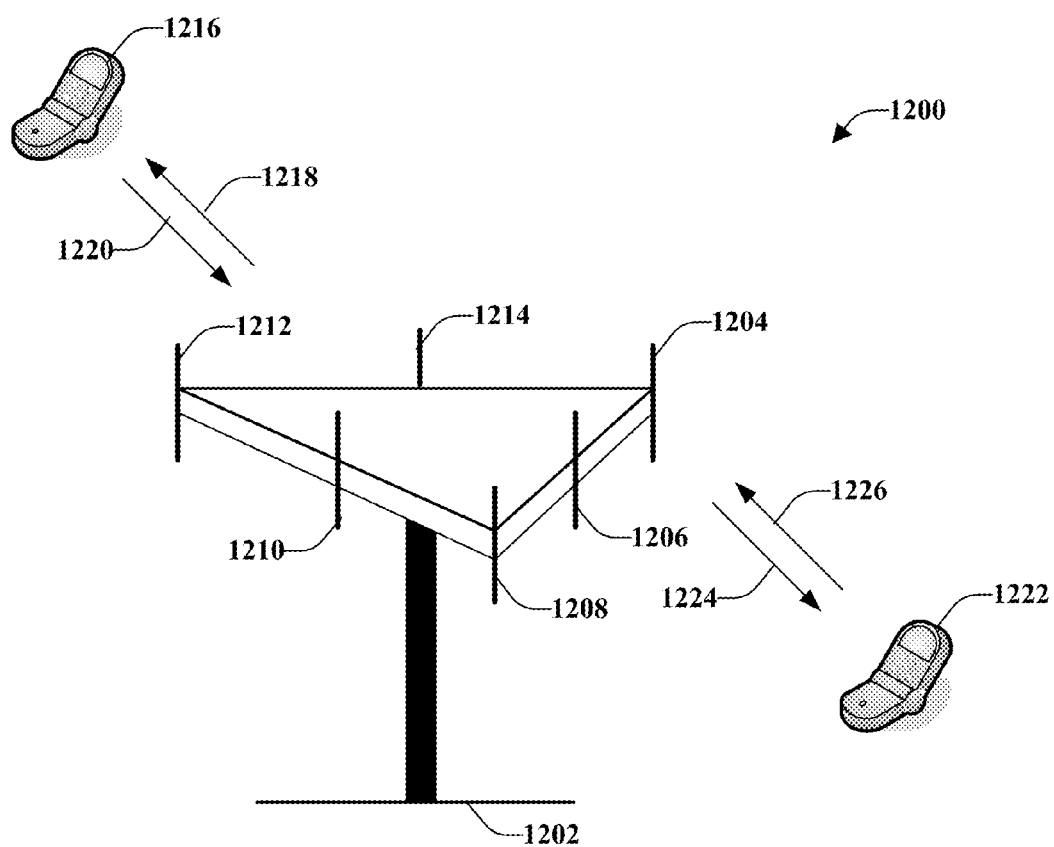
FIG. 12 illustrates a multiple access wireless communication system according to one or more aspects.

Referring now to FIG. 12, a multiple access wireless communication system 1200 according to one or more aspects is illustrated. A wireless communication system 1200 can include one or more base stations in contact with one or more user devices. Each base station provides coverage for a plurality of sectors. A three-sector base station 1202 is illustrated that includes multiple antenna groups, one including antennas 1204 and 1206, another including antennas 1208 and 1210, and a third including antennas 1212 and 1214. According to the figure, only two antennas are shown for each antenna group, however, more or fewer antennas may be utilized for each antenna group. Mobile device 1216 is in communication with antennas 1212 and 1214, where antennas 1212 and 1214 transmit information to mobile device 1216 over forward link 1218 and receive information from mobile device 1216 over reverse link 1220. Forward link (or downlink) refers to communication link from base stations to mobile devices, and reverse link (or uplink) refers to communication link from mobile devices to base stations. Mobile device 1222 is in communication with antennas 1204 and 1206, where antennas 1204 and 1206 transmit information to mobile device 1222 over forward link 1224 and receive information from mobile device 1222 over reverse link 1226. In a FDD system, for example, communication links 1218, 1220, 1224, and 1226 might utilize different frequencies for communication. For example, forward link 1218 might use a different frequency than the frequency utilized by reverse link 1220.

Each group of antennas and/or area in which they are designated to communicate may be referred to as a sector of base station 1202. In one or more aspects, antenna groups each are designed to communicate to mobile devices in a sector or areas covered by base station 1202. A base station may be a fixed station used for communicating with terminals.

In communication over forward links 1218 and 1224, transmitting antennas of base station 1202 can utilize beam-forming in order to improve a signal-to-noise ratio of forward links for different mobile devices 1216 and 1222. Also, a base station utilizing beamforming to transmit to mobile devices scattered randomly through its coverage area might cause less interference to mobile devices in neighboring cells than interference that can be caused by a base station transmitting through a single antenna to all mobile devices in its coverage area.

Figure 13:
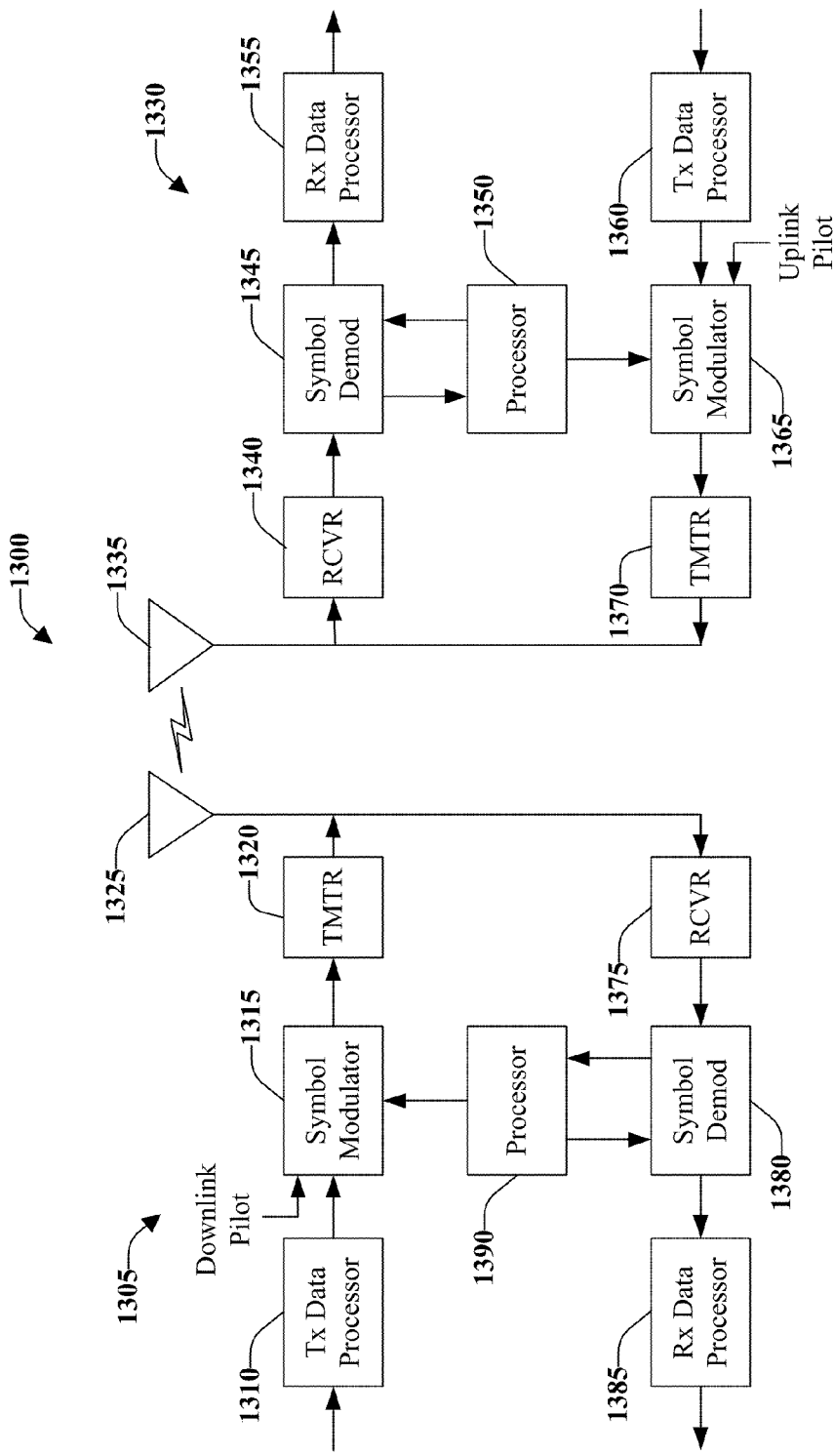
FIG. 13 illustrates an exemplary wireless communication system, according to various aspects.

FIG. 13 illustrates an exemplary wireless communication system 1300, according to various aspects. Wireless communication system 1300 depicts one base station and one terminal for sake of brevity. However, it is to be appreciated that system 1300 can include more than one base station or access point and/or more than one terminal or user device, wherein additional base stations and/or terminals can be substantially similar or different from the exemplary base station and terminal described below. In addition, it is to be appreciated that base station and/or terminal can employ various aspects described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes data symbols and pilot symbols and provides a stream of symbols. A symbol modulator 1315 multiplexes data and pilot symbols and obtains a set of N transmit symbols. Each transmit symbol may be a data symbol, a pilot symbol, or a signal value of zero. Pilot symbols may be sent continuously in each symbol period. Pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1320 receives and converts the stream of symbols into one or more analog signals and further conditions (e.g., amplifies, filters, and frequency upconverts) the analog signals to generate a downlink signal suitable for transmission over wireless channel. Downlink signal is then transmitted through an antenna 1325 to terminals. At terminal 1330, an antenna 1335 receives downlink signal and provides a received signal to a receiver unit (RCVR) 1340. Receiver unit 1340 conditions (e.g., filters, amplifies, and frequency downconverts) received signal and digitizes the conditioned signal to obtain samples. A symbol demodulator 1345 obtains N received symbols and provides received pilot symbols to a processor 1350 for channel estimation. Symbol demodulator 1345 further receives a frequency response estimate for the downlink from processor 1350, performs data demodulation on received data symbols to obtain data symbol estimates (which are estimates of transmitted data symbols), and provides data symbol estimates to an RX data processor 1355, which demodulates (e.g., symbol demaps), deinterleaves, and decodes the data symbol estimates to recover the transmitted traffic data. Processing by symbol demodulator 1345 and RX data processor 1355 is complementary to processing by symbol modulator 1315 and TX data processor 1310, respectively, at access point 1305.

On the uplink, a TX data processor 1360 processes traffic data and provides data symbols. A symbol modulator 1365 receives and multiplexes data symbols with pilot symbols, performs modulation, and provides a stream of symbols. A transmitter unit 1370 then receives and processes the stream of symbols to generate an uplink signal, which is transmitted by antenna 1335 to access point 1305.

At access point 1305, the uplink signal from terminal 1330 is received by antenna 1325 and processed by a receiver unit 1375 to obtain samples. A symbol demodulator 1380 then processes the samples and provides received pilot symbols and data symbol estimates for uplink. An RX data processor 1385 processes data symbol estimates to recover traffic data transmitted by terminal 1330. A processor 1390 performs channel estimation for each active terminal transmitting on uplink.

Processors 1390 and 1350 direct (e.g., control, coordinate, manage, . . . ) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for uplink and downlink, respectively.

For a multiple-access system (e.g., FDMA, OFDMA, CDMA, TDMA, and the like), multiple terminals can transmit concurrently on uplink. For such a system, pilot subbands may be shared among different terminals. Channel estimation techniques may be used in cases where pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, or a combination thereof. With software, implementation can be through modules (e.g., procedures, functions, and so on) that perform functions described herein. Software codes may be stored in memory unit and executed by processors 1390 and 1350.

It is to be understood that the aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, techniques described herein may be implemented with modules (e.g., procedures, functions, and so on) that perform functions described herein. Software codes may be stored in memory units and executed by processors. Memory unit may be implemented within processor or external to processor, in which case it can be communicatively coupled to processor through various means as is known in the art. Further, at least one processor may include one or more modules operable to perform functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method performed by a first base station for using a dedicated reference signal for supporting Coordinated MultiPoint transmission, comprising:
   communicating with a second base station to coordinate a data transmission to a first user device from the first base station and the second base station;
   applying a cluster-specific scrambling to a first data modulation symbol and to a first pilot modulation symbol;

transmitting, in a first direction, the scrambled first data modulation symbol of the data transmission from the first base station such that transmission of the scrambled first data modulation symbol is coordinated with a transmission of the scrambled first data modulation symbol by the second base station in a second direction; and transmitting, in the first direction, the scrambled first pilot modulation symbol from the first base station such that transmission of the scrambled first pilot modulation symbol is coordinated with a transmission of the scrambled first pilot modulation symbol by the second base station in the second direction.

2. The method of claim 1, wherein the scrambling code for the cluster-specific scrambling is predetermined.

3. The method of claim 1, further comprising:
conveying on a control channel to the first user device a scrambling code for a cluster-specific scrambling.

4. The method of claim 1, further comprising:
applying a user-group specific scrambling before transmitting in the first direction.

5. The method of claim 1, further comprising:
communicating with the second base station to coordinate a data transmission of a second data modulation symbol to a second user device;
transmitting in a third direction, from the first base station, a second data modulation symbol intended for the second user device; and
transmitting from the first base station a second pilot modulation symbol in the second direction.

6. The method of claim 5, further comprising, based on the coordination between the first base station and the second base station:
transmitting in a fourth direction, from the second base station, the second data modulation symbol intended for the second user device and the second pilot modulation symbol.

7. The method of claim 5, wherein the transmitting in the first direction comprises transmitting the first pilot modulation symbol on a first layer and the transmitting in the third direction comprises transmitting the second pilot modulation symbol on a second layer.

8. The method of claim 5, further comprising:
including the first pilot modulation symbol in a first dedicated reference signal and the second pilot modulation symbol in a second dedicated reference signal; and
transmitting the first dedicated reference signal on a first layer and the second dedicated reference signal on a second layer, wherein the first layer and the second layer are mutually orthogonal.

9. The method of claim 5, wherein transmitting the first pilot modulation symbol in the first direction and the second pilot modulation symbol in the third direction comprises transmitting the first pilot modulation symbol and the second pilot modulation symbol on orthogonal resources.

10. The method of claim 9, wherein the transmitting includes transmitting the first pilot modulation symbol.

11. The method of claim 5, further comprising:
including the first pilot modulation symbol in a first dedicated reference signal and the second pilot modulation symbol in a second dedicated reference signal, wherein the first dedicated reference signal and the second dedicated reference signal target Physical Downlink Shared Channel demodulation.

12. The method of claim 11, further comprising:
processing the first dedicated reference signal and the second dedicated reference signal through a pre-coding operation.

13. The method of claim 11, further comprising:
including the first dedicated reference signal and the second dedicated reference signal in resource blocks and layers scheduled by the first base station for the transmission.

14. The method of claim 1, wherein the coordination between the first base station and the second base station comprises employing cooperative beam-forming.

15. A wireless communications apparatus including a first base station, the first base station comprising:
a memory that retains instructions related to:
synchronizing with a second base station to coordinate a data transmission to a first mobile device;
applying a cluster-specific scrambling to a first data modulation symbol and to a first pilot modulation symbol;
transmitting in a first direction the scrambled first data modulation symbol of the data transmission such that transmission of the scrambled first data modulation symbol is coordinated with a transmission of the scrambled first data modulation symbol by the second base station in a second direction; and
transmitting in the first direction the scrambled first pilot modulation symbol such that transmission of the scrambled first pilot modulation symbol is coordinated with a transmission of the scrambled first pilot modulation symbol by the second base station in the second direction; and
a processor, coupled to the memory, configured to execute the instructions retained in the memory.

16. The wireless communications apparatus of claim 15, wherein the memory retains further instructions related to conveying to the first mobile device a scrambling code for the cluster-specific scrambling.

17. The wireless communications apparatus of claim 15, wherein the instructions related to the synchronizing comprise instructions related to employing cooperative beam-forming.

18. The wireless communications apparatus of claim 15, wherein the memory retains further instructions related to synchronizing with the second base station a transmission of a second data modulation symbol to a second mobile device and transmitting in a third direction the second data modulation symbol and a second pilot modulation symbol.

19. The wireless communications apparatus of claim 18, wherein the memory retains further instructions related to transmitting the first pilot modulation symbol and the second pilot modulation symbol on Time Division Multiplexed resources, Frequency-Division Multiplexed resources, Code-Division Multiplexed resources, or combinations thereof.

20. A wireless communications apparatus that utilizes a dedicated reference signal for supporting Coordinated MultiPoint transmission, comprising:
means for communicating with a second base station to coordinate a data transmission to a first user device from a first base station and the second base station;
means for applying a cluster-specific scrambling to a first data modulation symbol and to a first pilot modulation symbol;
means for transmitting in a first direction the scrambled first data modulation symbol of the data transmission from the first base station such that transmission of the scrambled first data modulation symbol is coordinated with a transmission of the scrambled first data modulation symbol by the second base station in a second direction; and means for transmitting in the first direction, the scrambled first pilot modulation symbol from the first base station such that transmission of the scrambled first pilot modulation symbol is coordinated with a transmission of the scrambled first pilot modulation symbol by the second base station in the second direction.

21. The wireless communications apparatus of claim 20, further comprising:
means for transmitting in a third direction a second data modulation symbol and a second pilot modulation symbol from the first base station in accordance with the communicating, wherein the means for transmitting in the first direction transmits the first pilot modulation symbol on a first layer and the means for transmitting in the third direction transmits the second pilot modulation symbol on a second layer.

22. The wireless communications apparatus of claim 20, further comprising:
means for inserting the first pilot modulation symbol in a first dedicated reference signal and the second pilot modulation symbol in a second dedicated reference signal, wherein the means for transmitting in the first direction transmits the first dedicated reference signal on a first layer and the means for transmitting in the second direction transmits the second dedicated reference signal on a second layer, wherein the first layer and the second layer are mutually orthogonal.

23. The wireless communications apparatus of claim 20, wherein a scrambling code for the cluster-specific scrambling is predetermined; and
wherein the wireless communication apparatus further comprises:
means for sending the scrambling code to the first user device and the second base station.

24. A computer program product, comprising:
a non-transitory computer-readable medium comprising:
a first set of codes for causing a computer to synchronize a transmission of a first data modulation symbol to a first mobile device;
a second set of codes for causing the computer to have a first base station apply a cluster-specific scrambling to a first data modulation symbol and to a first pilot modulation symbol;
a third set of codes for causing the computer to have a first base station transmit in a first direction the scrambled first data modulation symbol and the scrambled first pilot modulation symbol in accordance with the synchronizing; and
a fourth set of codes for causing the computer to have a second base station transmit in a second direction the scrambled first data modulation symbol and the scrambled first pilot modulation symbol in accordance with the synchronizing, wherein the synchronizing comprises employing cooperative beam-forming.

25. The computer program product of claim 24, the computer-readable medium further comprising:
a fifth set of codes for causing the computer to apply a cluster-specific scrambling before transmitting in the first direction; and
a sixth set of codes for causing the computer to convey to the first mobile device a scrambling code for the cluster-specific scrambling.

26. The computer program product of claim 24, the computer-readable medium further comprising:
a fifth set of codes for causing the computer to synchronize a transmission of a second data modulation symbol to a second mobile device; and
a sixth set of codes for causing the computer to transmit in a third direction the second data modulation symbol and a second pilot modulation symbol.

27. At least one processor configured to utilize a dedicated reference signal for supporting Coordinated MultiPoint transmission, comprising:
a first module for coordinating a data transmission to a first user device from the first base station and a second base station;
a second module for applying a cluster-specific scrambling to a first data modulation symbol and to a first pilot modulation symbol;
a third module for transmitting in a first direction the scrambled first data modulation symbol of the data transmission from the first base station such that transmission of the scrambled first data modulation symbol is coordinated with a transmission of the scrambled first data modulation symbol by the second base station in a second direction; and
a fourth module for transmitting in the first direction, the scrambled first pilot modulation symbol from the first base station such that transmission of the scrambled first pilot modulation symbol is coordinated with a transmission of the scrambled first pilot modulation symbol by the second base station in the second direction.

28. The at least one processor of claim 27, wherein the second module transmits the first pilot modulation symbol on Time Division Multiplexed resources, Frequency-Division Multiplexed resources, Code-Division Multiplexed resources, or combinations thereof.

29. A method performed by a mobile device for receiving a dedicated reference signal for supporting Coordinated MultiPoint, comprising:
receiving from a first direction a scrambled data modulation symbol intended for the mobile device;
receiving a scrambled pilot modulation symbol from the first direction;
receiving from a second direction the scrambled data modulation symbol intended for the mobile device; and
receiving the scrambled pilot modulation symbol from the second direction substantially concurrent to the receiving the scrambled pilot modulation symbol from the first direction, wherein the data modulation symbol is received at the mobile device in connection with a coordinated transmission between a first base station and at least a second base station, and wherein a cluster-specific scrambling is applied by the first base station and the second base station before receiving from the first direction and before receiving from the second direction.

30. The method of claim 29, further comprising
receiving on a control channel a scrambling code for the cluster-specific scrambling.

31. The method of claim 29, further comprising:
receiving a user-group specific scrambling, wherein the user-group specific scrambling is applied by the first base station and the second base station before receiving from the first direction and from the second direction.

32. The method of claim 29, wherein the receiving the pilot modulation symbol from the first direction and the second direction comprises receiving the pilot modulation symbol on Time Division Multiplexed resources, Frequency-Division Multiplexed resources, Code-Division Multiplexed resources, or combinations thereof.

33. A wireless communications apparatus, comprising:
a memory that retains instructions for:

receiving from a first direction a scrambled data modulation symbol and receiving a scrambled pilot modulation symbol from the first direction;

receiving from a second direction the scrambled data modulation symbol and receiving the scrambled pilot modulation symbol from the second direction substantially concurrent to the receiving the scrambled pilot modulation symbol from the first direction, wherein the scrambled data modulation symbol and the scrambled pilot modulation symbol received from the first direction are from a first node that coordinated with at least a second node transmitting the scrambled data modulation symbol and the scrambled pilot modulation symbol from the second direction, wherein a cluster-specific scrambling is applied by the first base station and the second base station before receiving from the first direction and before receiving from the second direction; and a processor, coupled to the memory, configured to execute the instructions retained in the memory.

34. The wireless communications apparatus of claim 33, the memory retains further instructions related to receiving from the first direction a cluster-specific scrambling code before receiving from the first direction the data modulation symbol.

35. The wireless communications apparatus of claim 33, wherein the memory retains further instructions related to receiving the pilot modulation symbol on Time Division Multiplexed resources, Frequency-Division Multiplexed resources, Code-Division Multiplexed resources, or combinations thereof.

36. A wireless communications apparatus that receives a dedicated reference signal for supporting Coordinated MultiPoint, comprising:

means for receiving from a first direction a scrambled data modulation symbol and a scrambled pilot modulation symbol; and means for receiving from a second direction the scrambled data modulation symbol and the scrambled pilot modulation symbol, wherein the first direction and the second direction were coordinated between at least two base stations such that the scrambled pilot modulation symbol is received from the first direction and the second direction substantially concurrently, wherein a cluster-specific scrambling is applied by the first base station and the second base station before receiving from the first direction and before receiving from the second direction.

37. The wireless communications apparatus of claim 36, further comprising:

means for obtaining a scrambling code for a cluster-specific scrambling applied to the data modulation symbol and the pilot modulation symbol; and means for decoding the data modulation symbol and the pilot modulation symbol with the scrambling code.

38. A computer program product, comprising:

a non-transitory computer-readable medium, comprising:

a first set of codes for causing a computer to receive from a first direction a scrambled data modulation symbol and a scrambled pilot modulation symbol; and a second set of codes for causing the computer to receive from a second direction the scrambled data modulation symbol and the scrambled pilot modulation symbol, wherein transmission in the first direction and transmission in the second direction are synchronized between at least two transmitting base stations, wherein a cluster-specific scrambling is applied by the first base station and the second base station before receiving from the first direction and before receiving from the second direction.

39. The computer program product of claim 38, the computer-readable medium further comprising:

a third set of codes for causing the computer to receive a scrambling code for a cluster-specific scrambling applied to the data modulation symbol and the pilot modulation symbol; and a fourth set of codes for causing the computer to decode the data modulation symbol and the pilot modulation symbol with the scrambling code.

40. The computer program product of claim 38, wherein the first set of codes and the second set of codes receive the pilot modulation symbol on Time Division Multiplexed resources, Frequency-Division Multiplexed resources, Code-Division Multiplexed resources, or combinations thereof.

41. At least one processor configured to utilize a dedicated reference signal for supporting Coordinated MultiPoint reception, comprising:

a first module for receiving a scrambled data modulation symbol and a scrambled pilot modulation symbol from a first direction; and a second module for receiving from a second direction the scrambled data modulation symbol and the scrambled pilot modulation symbol, wherein transmission in the first direction and transmission in the second direction are synchronized between at least two transmitting base stations, wherein a cluster-specific scrambling is applied by the first base station and the second base station before receiving from the first direction and before receiving from the second direction.

42. The at least one processor of claim 41, wherein the first module and the second module receive the pilot modulation symbol on Time Division Multiplexed resources, Frequency-Division Multiplexed resources, Code-Division Multiplexed resources, or combinations thereof.

* * * * *